United States Patent [19]

Kramer

[11] Patent Number: 4,595,266
[45] Date of Patent: Jun. 17, 1986

[54] MULTIPLE PROJECTION OPTICS SLIDE PROJECTION APPARATUS USING A CIRCULAR SLIDE TRAY, HAVING FIXED-POSITION SLIDE GATES

[75] Inventor: Gideon A. Kramer, Seattle, Wash.

[73] Assignee: Source Kramer Corporation, Mukilteo, Wash.

[21] Appl. No.: 609,542

[22] PCT Filed: Mar. 16, 1984

[86] PCT No.: PCT/US84/00429
§ 371 Date: Mar. 16, 1984
§ 102(e) Date: Mar. 16, 1984

[87] PCT Pub. No.: WO85/04265
PCT Pub. Date: Sep. 26, 1985

[51] Int. Cl.⁴ .......................................... G03B 23/16
[52] U.S. Cl. ................................... 353/94; 353/34; 353/48; 353/111; 353/86
[58] Field of Search .................. 353/89, 90, 111, 112, 353/82, 83, 34, 48, 49, 93

[56] References Cited

U.S. PATENT DOCUMENTS

| | | | |
|---|---|---|---|
| 3,499,707 | 3/1970 | Brueckner | 353/82 X |
| 3,501,233 | 3/1970 | Winkler et al. | 353/111 X |
| 3,514,198 | 5/1970 | Schacht | 353/21 |
| 3,677,631 | 7/1972 | Inglis | 353/83 |
| 3,689,140 | 9/1972 | Harvey | 353/90 |
| 4,402,584 | 6/1983 | Palmer . | |

FOREIGN PATENT DOCUMENTS

| | | | |
|---|---|---|---|
| 3100485 | 9/1982 | Fed. Rep. of Germany | 353/86 |
| 721769 | 10/1968 | France . | |

Primary Examiner—Harry N. Haroian
Attorney, Agent, or Firm—Jensen & Puntigam

[57] ABSTRACT

A slide projector having two projection optics systems (12,14) for display of slides on a screen. Each projection optics system includes a fixed position slide gate (24, 36) into and from which slides move relative to a circular slide tray (16), which rotates about a fixed vertical axis to access each compartment therein relative to both slide gates.

10 Claims, 8 Drawing Figures

MULTIPLE PROJECTION OPTICS SLIDE PROJECTION APPARATUS USING A CIRCULAR SLIDE TRAY, HAVING FIXED-POSITION SLIDE GATES

TECHNICAL FIELD

This invention relates generally to the slide projector art, and more specifically concerns a multiple projection optics slide projection system which includes a circular slide tray and two fixed-position slide gates in which slides are projected.

BACKGROUND ART

In the consumer slide projector market, the most successful design in recent years incorporates a circular slide receptacle or tray, for storage of the slides to be projected. In operation, the slide tray, which is mounted on top of the slide projector, is rotated about a fixed vertical axis so that the compartment containing the slide to be projected is in registry with the slide gate therebeneath. The slide moves through a slot in the bottom of the slide tray by gravity into the slide gate and is then projected. Following projection, the slide is moved by a mechanical lifter from the slide gate back into its compartment in the slide tray. The same process occurs for each slide to be projected.

Exemplary of this design currently on the market is a Kodak slide projector and its mating slide tray, sold, respectively, under the trademark Carousel. An example of a similar projector in the patent literature is U.S. Pat. No. 3,276,314 to Robinson. Such mechanically operated and controlled slide projectors have been extremely successful in the consumer slide projector market.

However, such conventional slide projectors have only one projection optics system, including a single projection lens. Thus, the previously projected slide must be moved from the slide gate back into its original compartment in the slide tray before the next slide can be moved into the gate and projected. This results in a delay between the projection of successive slides.

Lap-dissolve projector arrangements have been developed to eliminate this delay and provide a smooth transition between successive slides. In one solution, which is currently used extensively, several single optics slide projectors are operated together, controlled by an interface device. It is not uncommon for three or even more projectors to be used together for a sophisticated slide presentation.

Another solution is a single projector having multiple projection optics systems. However, significant difficulties have been encountered with such an arrangement, particularly with respect to the slide movement between the slide tray and the two optics systems. Initial attempts included two magazine-type slide trays, one for each optics system. Such an arrangement basically is two projectors contained in a single housing. The next development used a single magazine or drum slide tray in which slides were moved out of the slides of the slide tray. The slide tray was moved forwards and backwards in a particular sequence in order to maintain proper storage of the slides. Such a structure is shown in U.S. Pat. No. 3,462,215 to Floden. Although the optics systems for both of the above solutions are relatively simple, neither solution was usable with a circular slide tray.

Initial development of a multiple-optics slide projector which was capable of using a circular slide tray is shown in U.S. Pat. No. 3,501,233 to Winkler et al. However, the Winkler structure is quite complicated, includes a slide tray support structure in which the tray is alternately rocked about points on opposing sides of the tray, and more importantly, requires a careful initial positioning of the slides into two separate groups in the tray.

The next advance in the art is exemplified by U.S. Pat. No. 3,689,140 to Harvey, which teaches a circular slide tray and two projection optics systems, in which slides can be loaded in the tray in a normal sequence. However, the tray in operation is shifted laterally to access the two slide gates, as well as rotated. Such a structure is complex mechanically and expensive to implement. The next development in the art is exemplified by U.S. Pat. No. 4,165,161 to Kramer, which solved the problem of Harvey by using swinging slide gates, which moved in operation between a common load position and separate project positions. The Kramer structure, however, is also fairly complex and fairly sophisticated to both operate and maintain.

Thus, the lap-dissolve slide projectors known to the art at the time of applicant's invention were quite complex mechanically, particularly with respect to the tray drive system and/or the projection optics system, and in some cases required special loading of the slides in the slide tray.

DISCLOSURE OF THE INVENTION

Accordingly, the present invention is a slide projection apparatus which is adapted to carry a circular slide tray which has a lower pan portion with at least one slot therein through which slides can move and an upper receptacle portion comprising a series of compartments in which slides are arranged in a predetermined sequence, the receptacle portion being rotatable relative to said pan portion about a single vertical axis. The projection apparatus includes first and second projection optics systems defining first and second image projection paths, each projection optics system including a fixed-position slide gate located beneath the circular slide tray, wherein slides move into and from said slide gates relative to the circular slide tray, the image projection systems being arranged relative to each other and to the slide tray such that each compartment in the slide tray can be brought into registry with each slide gate and such that slides positioned in the slide tray in the predetermined sequence can be displayed without reversal, in said predetermined sequence. The slide projection apparatus includes means for rotating the circular slide tray about the fixed vertical axis to access each compartment of the circular slide tray relative to each slide tray.

BRIEF DESCRIPTION OF THE DRAWINGS

FIG. 4b is an elevation view of the structure of FIG. 4a.

FIG. 5b is an elevational view of the embodiment of FIG. 5a.

BEST MODE FOR CARRYING OUT THE INVENTION

Figure 1:
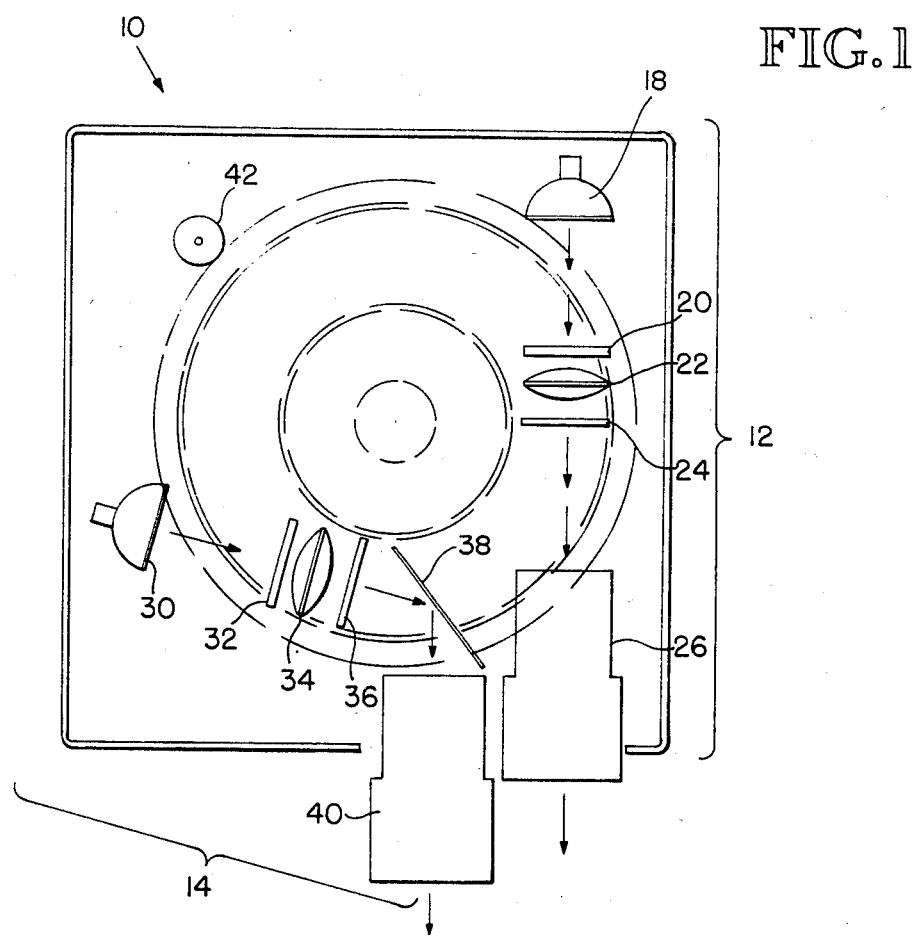
FIG. 1 is a plan view of one embodiment of the slide projection apparatus of the present invention, showing two independent projection optics systems, with fixed position slide gates, the slide tray for the apparatus being shown superimposed relative to the projection optics systems.

FIG. 1 shows one embodiment of the apparatus of the present invention, in which each of two projection optics systems includes a separate projection lens. The slide tray is shown superimposed in dashed outline to show the relationship between the two projection optics systems and the tray.

Projection optics systems 12 and 14 are contained in a conventional projector housing 10. A single circular slide tray 16 is used to store the slides for the apparatus. The slides may be conventionally loaded in the slide tray in the sequence in which they are to be displayed. In operation, slides move from slide tray 16 by gravity, lowered by a conventional lifter apparatus (not shown), into one or the other of the projection optics systems, and are moved from the projection optics systems back into the slide tray 16 by means of the lifter. The particular mechanism for actually moving a slide between the slide tray and the image projection systems form no part of the present invention, and hence is not shown herein in detail. Reference is made to the patents mentioned above, particularly the U.S. Pat. No. 4,165,161, patent, for examples of approximate slide moving structure.

Projection optics system 12 defines a straight projection path along the left side of the projector. It includes a conventional light source 18, a heat filter 20, a condenser lens 22, a fixed position slide gate 24 into and from which slides are moved relative to the tray 16, and a projection lens 26. An additional light filter element (not shown) can be positioned in projection optics system 12 to equalize the light on the screen between the two optics systems, if necessary. The individual elements per se of the projection optics system 12 and their relative spacing are known in the art. Slide gate 24 in the present invention is positioned within the projector apparatus such that the compartments of the slide tray 16 may be sequentially moved into registry therewith by rotation of the tray alone, i.e. without lateral movement or rocking of the tray.

Projection optics system 14 defines an angled projection path. The initial portion of the projection path of optics system 14 is at an angle to the projection path of projection optics system 12. The remaining portion of the projection path of optics system 14 is parallel to the projection path of optics system 14, so that the longitudinal axes of the respective projection lenses thereof are parallel. Projection optics system 14 includes a light source 30, a heat filter 30, a condenser lens 34, a fixed position slide gate 36, a reflecting mirror 38 and a projection lens 40. Again, the elements per se of projection optics system 14, including mirror 28, and the relative spacing thereof, are known.

Projection optics system 14 is arranged so that the slide tray compartments can be moved sequentially into registry with the slide gate 36, and slide gate 24, by rotation of the tray alone, without any lateral movement thereof. Further, projection optics system 14 is arranged relative to projection optics system 12 such that the respective projection lenses 26 and 40 are substantially adjacent each other, with projection lens 40 being positioned slightly forwardly of projection lens 26. The arrangement of FIG. 1, as with the arrangement of FIGS. 2 and 3, permits slides to be loaded in a conventional sequence in the slide tray and displayed in that sequence, without any reversal. Thus, special loading of the slides in the slide tray is not necessary.

The fixed position slide gates 24 and 36 are conventional in construction, configured and arranged so as to hold a slide firmly in position by clamping, typically at one side toward the other side and against the face of the slide, following movement of the slide from the tray into the gate. After the slide has been projected, the slide is lifted back up into its original compartment in the slide tray, typically while it is still clamped. The clamps on the gate are then released to allow the movement of the next slide into the gate.

In the embodiment shown, the arrangement of the respective projection optics systems 12 and 14 is such that the housing within which they are positioned is approximately the size of a conventional slide projector. The two fixed gates 24 and 36 in the embodiment shown are at an angle of approximately 105 degrees relative to each other. This arrangement has proven to be advantageous in the spacing of the two projection optics systems, but also results in a relatively close side-by-side positioning of the respective projection lenses thereof, with a relatively minimum difference (approximately $\frac{1}{2}$ inch) in the relative longitudinal position thereof.

Figure 2:
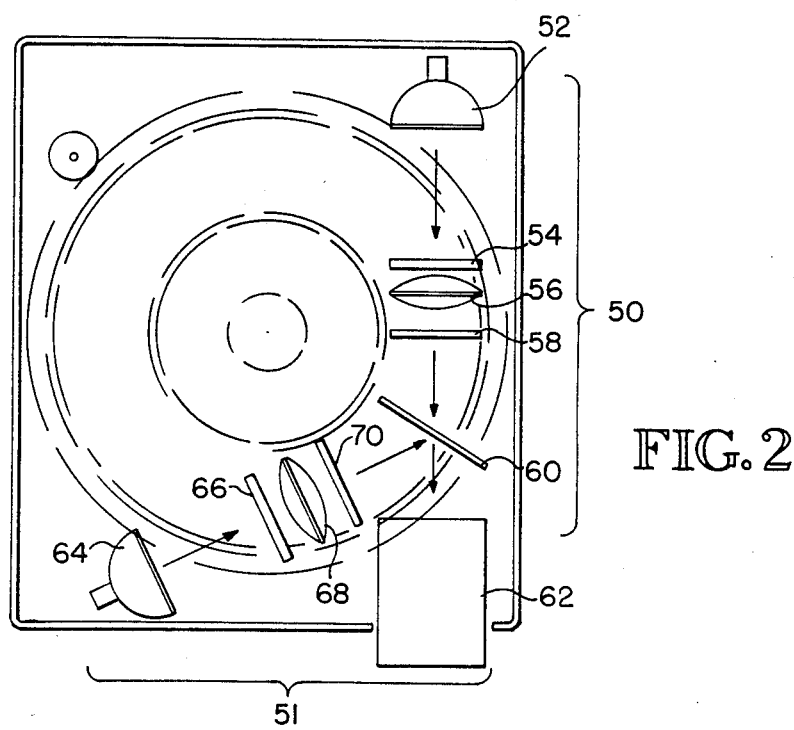
FIG. 2 is a single projection lens embodiment of the slide projection apparatus shown in FIG. 1.

In an alternative arrangement, projection optics system 14 is arranged at an angle of approximately 65 degrees, similar to that shown in FIG. 2. In this arrangement, again referring to FIG. 1, the mirror 38 is positioned on the other side of the projection path of projection optics system 12, so that the projection path of optics system 14 in effect crosses the projection path of optics system 12. In all such embodiments, however, the distance between the slide and the projection lens in each optics system is the same if the same projection lenses are used in each optics system. The two projection lenses 26 and 40 are supported such that they can be moved toward and away from each other to accomplish image separation, such as disclosed in U.S. Pat. No 4,416,520 to Milo Kramer.

In operation of the apparatus of FIG. 1, slide tray 16 is rotated about a fixed vertical axis, without rocking or other lateral movement, to service both projection optics systems. Tray 16 is driven at its rim by tray drive element 42. The conventional 80 compartment slide tray 16 includes a plurality of downwardly projecting pin-like elements at its periphery, which in one embodiment are operated on by a gear portion of drive element 42 to provide the desired positive control over the movement of the tray. Such a system can only be used, however, with the 80 compartment tray. In both the 80 compartment and the 140 compartment tray, the lower periphery of the slide tray has a notch in it. Another tray drive embodiment includes a drive ring which surrounds the peripheral edge of the tray and has a projection which engages the notch in the tray. The drive ring in turn is driven by element 42. Such an embodiment can be used with either the 80 or 140 compartment tray. The sequence of movement of the tray, as well as additional disclosure concerning the tray drive system, will be discussed in more detail hereinafter.

FIG. 2 shows an alternative embodiment using only one projection lens. A first projection optics system 50 includes a light source 52, a heat filter 54, a condenser lens 56 and a fixed slide gate 58. Image splitter 60 and projection lens 62 are shared with the other projection optics system 51. Projection optics system 51 comprises a light source 64, a heat filter 66, a condenser lens 68 and a slide gate 70, in addition to image splitter 60 and projection lens 62. Projection optics system 50 defines a straight image projection path along the left side of the projector, similar to that shown for the embodiment of FIG. 1. The image of optics system 50 is projected through image splitter 60 and through projection lens 62 onto the screen.

Image projection system 51 is positioned in the embodiment shown such that its fixed slide gate 70 is at an angle of approximately 65 degrees relative to slide gate 58 in projection optics system 50. Thus, the image projection path of projection optics system 51 is angled, with the image being reflected from image splitter 60 and then through the single projection lens 62 onto the screen. The arrangement of FIG. 2 is advantageous because it results in a reduced projector size, and is less expensive and easier to operate.

Figure 3:
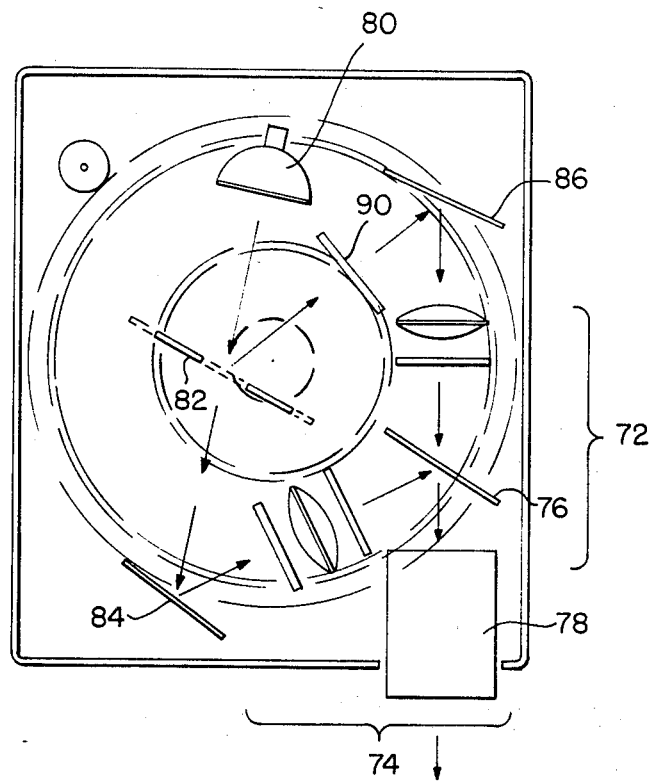
FIG. 3 is a variation of the embodiment of FIG. 2, with only one light source.

FIG. 3 shows a variation of the embodiment of FIG. 2, with only one light source. Two projection optics systems 72 and 74 are arranged similarly to those shown in FIG. 2, sharing an image splitter 76 and a single projection lens 78. Both projection optics system share in addition a single light source 80, the light from which is provided to the respective projection optics systems by means of a light shutter 82 and reflecting mirrors 84 and 86. Mirrors 84 and 86 could be "cold" mirrors, which pass most of the infrared light while reflecting the rest of the light. It may be possible to eliminate the heat filters with such an arrangement.

Light shutter 82 in the embodiment shown comprises two thin vertical plates supported in a track, the plates having a reflecting surface nearest light source 80. When shutter 82 is open, light from source 80 is reflected off mirror 84 into the path of projection optics system 74. When light shutter 82 is closed, light from source 80 is reflected off shutter 82, through a heat filter 90, and then is reflected off mirror 86 into projection optics system 72. The arrangement of FIG. 3 has the advantage of eliminating blackout flaps, and possibly dimmer control circuitry as well, which are necessary in more conventional lap-dissolve slide projectors.

FIGS. 4A, 4B and 5A, 5B show two embodiments for moving the slide tray between the two fixed gates in any of the embodiments of FIGS. 1–3. A conventional circular tray to be used with the present invention includes a bottom metal pan portion 100 and an upper slide receptacle portion 102, typically made of plastic. The slide receptacle portion is divided into compartments, typically 80 or 140, which house the slides. The tray is arranged such that the receptacle is movable relative to the pan. When the slide tray is positioned by the operator on a conventional slide projector, the pan is engaged so that in operation it remains fixed in position while the receptacle rotates relative thereto to access the slides.

In the conventional commercial slide tray, the pan has one slot therein through which slides move between the slide receptacle and the slide gate in which slides are projected. In a first embodiment of the tray drive structure of the present invention, shown in FIGS. 4A, 4B, the conventional pan is modified by cutting another slot 101 in the pan 100, similar in size and configuration to the original slot. The additional slot is positioned in the pan 100 such that when the slide tray is positioned on the slide projector of the present invention, the two slots are positioned directly over the fixed slide gates. With this embodiment, it is unnecessary to move the metal pan 100 during operation of the slide projector. The desired compartment in the slide receptacle 102 is addressed by movement of the receptacle 102 relative to the pan 100, as is the case for a conventional slide projector.

Figure 4A:
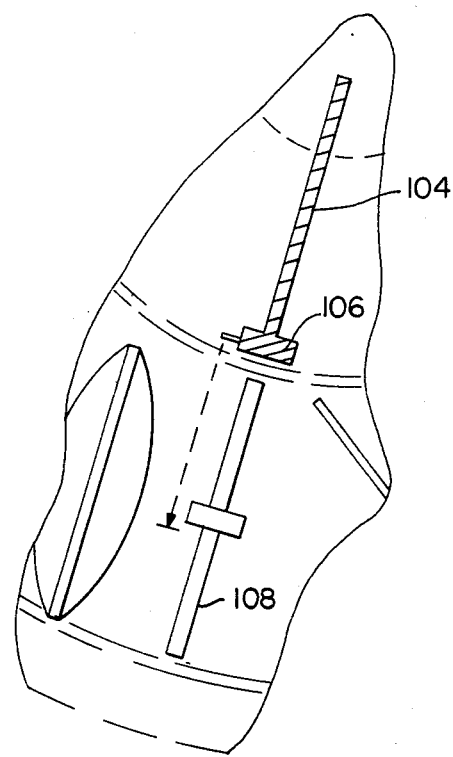
FIG. 4a is a plan view showing a portion of one embodiment of the tray drive structure of the present invention which can be used with any of the embodiments of FIGS. 1-3.
Figure 4B:
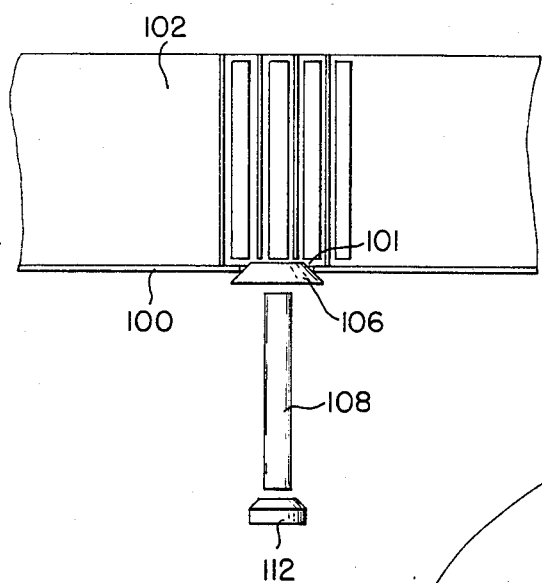

Associated with each slide gate in the above embodiment is a slide retainer or shoe and a slide lifter. Referring specifically to FIGS. 4A and 4B, which shows the shoe and the lifter for one slide gate, the slide shoe includes an elongated arm 104 with a small rounded foot 106 at the end thereof. In the embodiment shown, arm 104 and the foot 106 are aligned along the same radius as its associated slide gate. The slide shoe is mounted such that it moves between two positions in a substantially radial direction, through a piston-like action accomplished by means of a solenoid or similar mechanism (not shown). It should be understood, however, that the slide shoe could be mounted and move in other directions, such as at a right angle or tangentially to the slot, as opposed to radially.

Referring again to FIGS. 4A and 4B, foot 106 and the arm 104, in their retracted position, are completely free or removed from the slot 101 in the pan 100, which slot is directly over the slide gate and the slide therein 108, if any. In the retracted position, the slide shoe has moved radially towards the center of the slide tray. In the extended position of the slide shoe, foot 106 is approximately at the midpoint of slot 101, with a portion of foot 106 extending upward into slot 101 so that there exists a continuous surface over a portion of the total length of the slot. In this position of the slide shoe, the receptacle 102 is free to rotate without the slides dropping through either of the slots in the pan 100.

To load slides into the slide gates, receptacle 102 is rotated until the compartment containing the desired slide to be projected is in registry with the first slide gate. The lifter 112 is in the raised position, having remained there following the lifting of the previous slide back into its original compartment or having moved up without a slide prior to the loading of the first slide into the gate. The slide shoe in the embodiment shown is in the extended position when the receptacle moves and there is a slide in the slide gate. When there is no slide in the slide gate, the lifter is raised, and the slide shoe remains in its retracted position. The slide shoe and the lifter are arranged so that they can move as explained above without interfering with each other.

After the slide shoe is moved, if necessary, from its extended position to its retracted position, the slide to be projected rests on the lifter, and the slide in effect drops by gravity, but guided by the lifter, into the slide gate, clamped as explained above. There is also a slide drop sensor in the form of a light sensor or the like (not shown) which provides an indication of the dropping of a slide. In some cases, it will be undesirable to drop a slide, and when the sensor is actuated, the slide shoe can be brought back to its extended position under the slide, thereby preventing the slide from reaching the slide gate.

After the slide has reached the slide gate and clamped, it is projected. The slide shoe is then moved back to its extended position. The slide receptacle 102 is then moved until the compartment containing the desired slide to be projected is in registry with the second slide gate. If the slide shoe for that gate is in its extended position, it is moved to its retracted position, as explained above, and that slide then moves by gravity, with the lifter supporting it, into the slide gate, where it is ready to be projected following the projection of the slide already in the first slide gate. The slide shoe for the second slide gate is then moved back in its extended position.

The receptacle 102 is then rotated back so that the compartment originally containing the first desired slide is again in registry with the first slide gate. When the projection of that slide in the first slide gate is completed, the slide shoe is retracted and the slide lifter 112 is operated to lift the slide back up into the compartment. The lifter stays up, with the slide shoe retracted, and the receptacle is then rotated to access the compartment containing the next slide to be projected with the first slide gate. This process continues for each slide to be projected in sequence between the two fixed gates. After the presentation is complete, the slide tray is removed from the projector in conventional fashion.

Figure 5A:
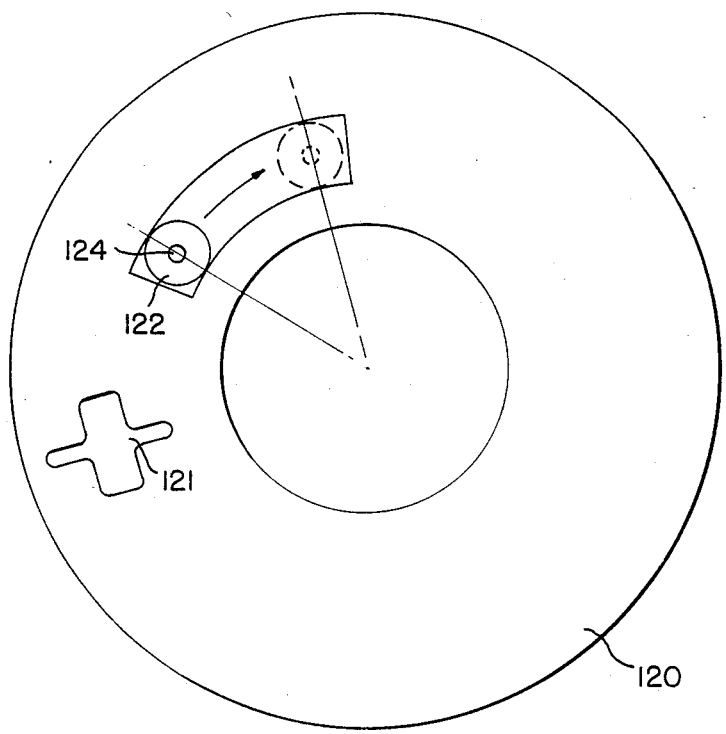
FIG. 5a is a bottom plan view showing a portion of another embodiment of the tray drive structure of the present invention which can be used with any of the embodiments of FIGS. 1-3.
Figure 5B:
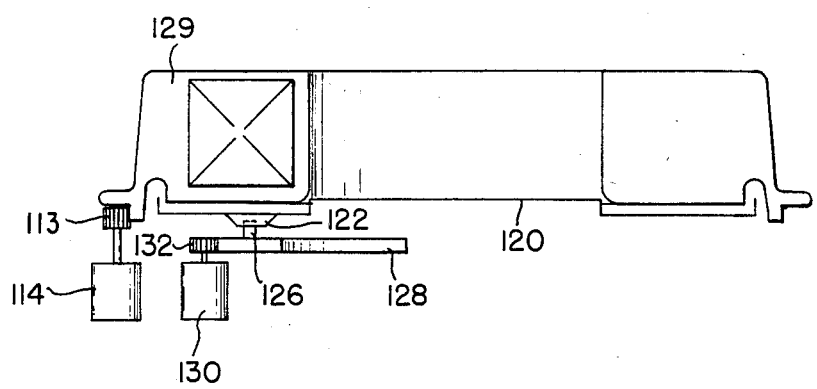

FIGS. 5A and 5B show a second embodiment for driving the slide tray in the present invention. In this embodiment, the slide tray pan 120 has only the one conventional slot 121, and therefore is identical to a conventional pan. Conventional commercial circular slide trays can thus be used without any modification in this embodiment. Extending slightly downwardly from the bottom surface of the tray pan 120 is a dimple 122, in the center of which is an opening 124. The projection apparatus of the present invention includes a small vertical pin 126 (see FIG. 5B), mounted on a section of gear 128, which is typically positioned in a closed track or slot (not shown) in the projector. The gear and pin structure is so positioned that when the slide tray is positioned on the projector, in its reference position, pin 126 extends upwardly through opening 124, engaging the metal pan of the slide tray.

The gear section 128 is driven through a horizontal arc by a gear 132, which in turn is driven by a motor 130. Thus, in this embodiment, the tray pan 120 is positively driven, independently of the slide receptacle 129. In the sequence of movements of the tray to load or unload slides from the respective fixed slide gates, the tray pan 120 is first moved so that the slot in the tray pan is in registry with the particular slide gate which is to be loaded/unloaded.

A single slide shoe, in the embodiment shown, moves with the tray pan in an extended position, to block any possible movement of slides through the slot. Alternatively, the projector could include a series of fixed shoes along the path of the slot between the two slide gates which operate in sequence to provide continuous support beneath the slot as it moves, or the tray could be moved as a complete unit with an empty compartment above the slot. Typically, but not necessarily, the slide receptacle moves with the tray pan when the tray pan is moved to position the slot therein in registry with a slide gate. When the slot is positioned, the receptacle is then moved independently to access the desired compartment. The shoe is then retracted and the slide may be moved.

More specifically with respect to the operational sequence, assuming that the respective slide gates are initially both empty, the slide tray is first positioned by the operator in its reference position on the projector. The tray pan and the receptacle are then rotated as a unit as explained above until the slot 121 in the pan 120 is in registry with the first slide gate. The slide receptacle 129 is then moved alone until the compartment containing the first slide to be projected is in registry with the slot 121 and the first slide gate. The lifter (not shown) is up at this point. The slide shoe (not shown) is then retracted, opening the slot, and the first slide moves down into the slide gate by gravity, resting on the lifter. The slide shoe is then extended. The tray pan and the tray receptacle are then moved as explained above to load the second slide into the second slide gate.

The tray pan and the receptacle are then rotated back together to the point where the slot 121 is above the first slide gate. The slide receptacle is then rotated by itself to the point where the compartment originally containing slide one is in registry with the slot 121 and the slide gate. The shoe is then retracted and the lifter is actuated, moving the slide back up into the compartment. The lifter remains in the raised position. The slide receptacle is then rotated so that the compartment containing the third slide to be projected is in registry with the slot and the slide gate, and the slide lowered into the gate for projection. This process continues until the slide presentation is completed.

Figure 6:
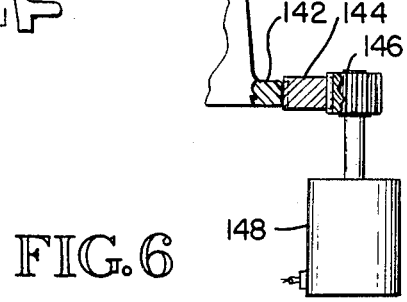
FIG. 6 is an elevational view showing a structure for driving the receptacle portion of the slide tray which can be used with the embodiments of FIGS. 4 and 5.

The slide receptacle will typically have either 80 or 140 compartments. The 80 compartment receptacle typically includes a plurality of lugs or pins which depend downwardly from the lower peripheral edge of the tray, one lug for each compartment. In one embodiment, the receptacle is then driven as shown in FIG. 5B, with gear 113 mating with the lugs on the tray and motor 114 driving the gear. The 80 and the 140 position receptacles both have a single notch in their lower peripheral surface. In another ebodiment, drive ring surrounds the lower peripheral edge of the tray, with a projection which extends into the notch in the tray. FIG. 6 shows a portion of a tray receptacle 140, the notch in the lower edge thereof 142, and the drive ring with its projection 144. The drive ring is rotated by a gear 146, which is driven by a motor 148. Such a drive structure for the 80 compartment tray is an alternative to the structure described above.

Thus, an apparatus has been described which provides a multiple image slide projection capability with fixed slide gates using a conventional circular slide tray which is rotated about a fixed central vertical axis. Although a preferred embodiment of the invention has been disclosed herein for illustration, it should be understood that various changes, modifications and substitutions may be incorporated in such embodiment without departing from the spirit of the invention as defined by the claims which follow.

I claim:

1. A slide projection apparatus which is adapted for operation with a circular slide tray which rotates about a central vertical axis and which has a lower pan portion with only one slot therein through which slides can move and an upper receptacle portion comprising a series of compartments in which slides are arranged in a predetermined sequence, the apparatus comprising:

first and second projection optics systems defining first and second image projection paths, each projection optics system including a fixed position slide gate located beneath the slide tray, wherein slides move into and from said slide gates relative to the circular slide tray;

means for rotating the lower pan portion circular slide tray and the upper receptacle portion and for rotating one portion independently of the other portion, so that the one slot in the lower pan portion and the compartments in the upper receptacle portion can be brought into alignment with the slide gates; and, means for controlling the rotation of the slide tray and for controlling the movement of the slides into and from the compartments of the slide tray in such a manner that the compartments of the slide tray can be accessed with respect to either slide gate, so that a sequence of slides present in consecutive compartments of the slide tray may be displayed in said sequence using the first and second projection optics systems in any sequence.

2. An apparatus of claim 1, wherein the circular slide tray rotates about a fixed vertical axis.

3. An apparatus of claim 1, wherein the first and second projection optics system are arranged such that in one image projection path, the slide images are directly projected through an image splitter, and in the other image projection path, the slide images ar reflected off the image splitter, undergoing an image reversal in the process, so that slides may be positioned in the compartments of the slide tray in a single orientation, without means in either of said first and second projection optics systems for reversing the image of the projected slides, other than said image splitter.

4. An apparatus of claim 1, including means permitting slides to move by gravity form said circular slide tray into the respective slide gates, and means for moving a slide in the respective slide gates back up into the circular slide tray.

5. An apparatus of claim 4, including means for moving the slide pan portion of the slide tray with, and independently of, the slide receptacle portion of the slide tray.

6. An apparatus of claim 5, wherein said rotating means includes means for rotating the slide receptacle at the rim thereof.

7. An apparatus of claim 1, including means in one of said projection optics systems for reversing the image thereof.

8. An apparatus of claim 1, wherein said respective fixed gates are separated by an angle of approximately 115 degrees, and wherein each projection optics system includes its own profection lens.

9. An apparatus of claim 1, wherein said respective fixed gates are separated by an angle of approximately 65 degrees, and said first and second projection optics systems share an image splitter and a projection lens.

10. An apparatus of claim 9, wherein said first and second projection optics systems share one light source, the projection apparatus including means for selectively directing light from said light source into said first and second projection optics systems.

* * * * *